US008025116B2

(12) United States Patent
Rogg

(10) Patent No.: US 8,025,116 B2
(45) Date of Patent: Sep. 27, 2011

(54) WHEEL HUB DRIVE FOR INDUSTRIAL TRUCKS

(75) Inventor: Andreas Rogg, Lubeck (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 1177 days.

(21) Appl. No.: 11/745,193

(22) Filed: May 7, 2007

(65) Prior Publication Data

US 2007/0267234 A1 Nov. 22, 2007

(30) Foreign Application Priority Data

May 19, 2006 (DE) .................. 10 2006 023 577

(51) Int. Cl.
*B60K 1/00* (2006.01)
(52) U.S. Cl. .................. 180/65.51; 180/65.6; 180/65.7
(58) Field of Classification Search .............. 180/65.1, 180/65.51, 65.6, 65.7
See application file for complete search history.

(56) References Cited

U.S. PATENT DOCUMENTS

| | | | | |
|---|---|---|---|---|
| 3,566,165 A * | 2/1971 | Lohr | .................. | 310/67 R |
| 3,812,928 A * | 5/1974 | Rockwell et al. | .......... | 180/65.51 |
| 3,892,300 A * | 7/1975 | Hapeman et al. | .......... | 180/65.51 |
| 3,897,843 A * | 8/1975 | Hapeman et al. | .......... | 180/65.51 |
| 4,402,374 A * | 9/1983 | Knur et al. | .................. | 180/65.7 |
| 4,406,340 A * | 9/1983 | Gennaux | .................... | 180/65.51 |
| 4,539,497 A * | 9/1985 | Boyer | .................... | 310/75 R |
| 4,930,590 A * | 6/1990 | Love et al. | .................... | 180/55 |
| 5,358,456 A * | 10/1994 | Deppert et al. | ............ | 475/154 |
| 6,355,996 B1 * | 3/2002 | Birkestrand | .................... | 310/54 |
| 6,367,571 B1 * | 4/2002 | Schwarz | .................... | 180/253 |
| 6,722,459 B1 * | 4/2004 | Wendl et al. | ............ | 180/65.51 |
| 6,752,227 B1 * | 6/2004 | Bachmann | ............ | 180/65.51 |
| 6,765,323 B2 * | 7/2004 | Takano et al. | ............ | 310/68 B |
| 6,852,061 B2 * | 2/2005 | Schoon | .................... | 475/348 |
| 7,100,722 B2 * | 9/2006 | Bowen | .................... | 180/65.51 |
| 7,228,928 B2 * | 6/2007 | Mizutani et al. | ............ | 180/65.51 |
| 7,245,052 B2 * | 7/2007 | Stubner | .................... | 310/77 |
| 7,249,643 B2 * | 7/2007 | Etzioni et al. | ............ | 180/65.51 |
| 7,350,605 B2 * | 4/2008 | Mizutani et al. | ............ | 180/65.51 |
| 7,420,301 B2 * | 9/2008 | Veny et al. | ............ | 310/75 C |
| 7,527,113 B2 * | 5/2009 | Jenkins | .................... | 180/65.51 |
| 7,530,416 B2 * | 5/2009 | Suzuki | .................... | 180/65.51 |
| 7,592,733 B2 * | 9/2009 | Naitou et al. | ............ | 310/216.058 |
| 7,622,836 B2 * | 11/2009 | DeVeny et al. | ............ | 310/75 C |
| 7,641,010 B2 * | 1/2010 | Mizutani et al. | ............ | 180/65.51 |

(Continued)

FOREIGN PATENT DOCUMENTS

DE 2316932 A * 10/1974

(Continued)

*Primary Examiner* — J. Allen Shriver, II
*Assistant Examiner* — Jacob Meyer
(74) *Attorney, Agent, or Firm* — Vidas, Arrett & Steinkraus

(57) ABSTRACT

A wheel hub drive with drive motor and drive gear system for industrial trucks, with the following features: driving and output axis of the drive gear system, rotation axis of the wheel and driving axis of the drive motor are disposed coaxially; the drive gear system is a single step or multi step planetary stepping gear system or a two or more step planetary coupler mechanism gear system, two horizontally spaced wheel bearings are located inside the drive gear system, wherein, a first wheel bearing is disposed between a first bearing portion, connected with the wheel hub, and a frame-fixed planet carrier, and a second wheel bearing is disposed between the first bearing portion and a frame-fixed second bearing portion or the frame-fixed planet carrier.

7 Claims, 9 Drawing Sheets

U.S. PATENT DOCUMENTS

| | | | |
|---|---|---|---|
| 7,735,589 B2 * | 6/2010 | Sugiyama | 180/65.51 |
| 2003/0062782 A1 * | 4/2003 | Takano et al. | 310/75 B |
| 2003/0139250 A1 * | 7/2003 | Bowman | 475/338 |
| 2003/0217878 A1 * | 11/2003 | Etzioni et al. | 180/65.5 |
| 2004/0065169 A1 * | 4/2004 | Ciszak et al. | 74/640 |
| 2004/0112656 A1 * | 6/2004 | Bowen | 180/65.5 |
| 2004/0214680 A1 * | 10/2004 | Schoon | 475/149 |
| 2005/0061565 A1 * | 3/2005 | Mizutani et al. | 180/65.5 |
| 2005/0236198 A1 * | 10/2005 | Jenkins | 180/65.5 |
| 2006/0219449 A1 * | 10/2006 | Mizutani et al. | 180/65.5 |
| 2008/0035399 A1 * | 2/2008 | Murata et al. | 180/65.5 |
| 2008/0169141 A1 * | 7/2008 | Suzuki | 180/65.7 |
| 2009/0166112 A1 * | 7/2009 | Yoshino et al. | 180/65.51 |
| 2009/0236158 A1 * | 9/2009 | Sakuma et al. | 180/65.51 |
| 2009/0312134 A1 * | 12/2009 | Schoon | 475/154 |

FOREIGN PATENT DOCUMENTS

| | | |
|---|---|---|
| DE | 196 33 071 A1 | 2/1998 |
| DE | 199 11 458 A1 | 10/1999 |
| DE | 100 61 221 A1 | 6/2002 |
| DE | 100 62 315 A1 | 7/2002 |
| DE | 101 32 319 A1 | 1/2003 |
| DE | 102 58 913 A1 | 7/2004 |
| DE | 103 34 939 A1 | 4/2005 |
| EP | 1 167 140 A2 | 6/2001 |

* cited by examiner

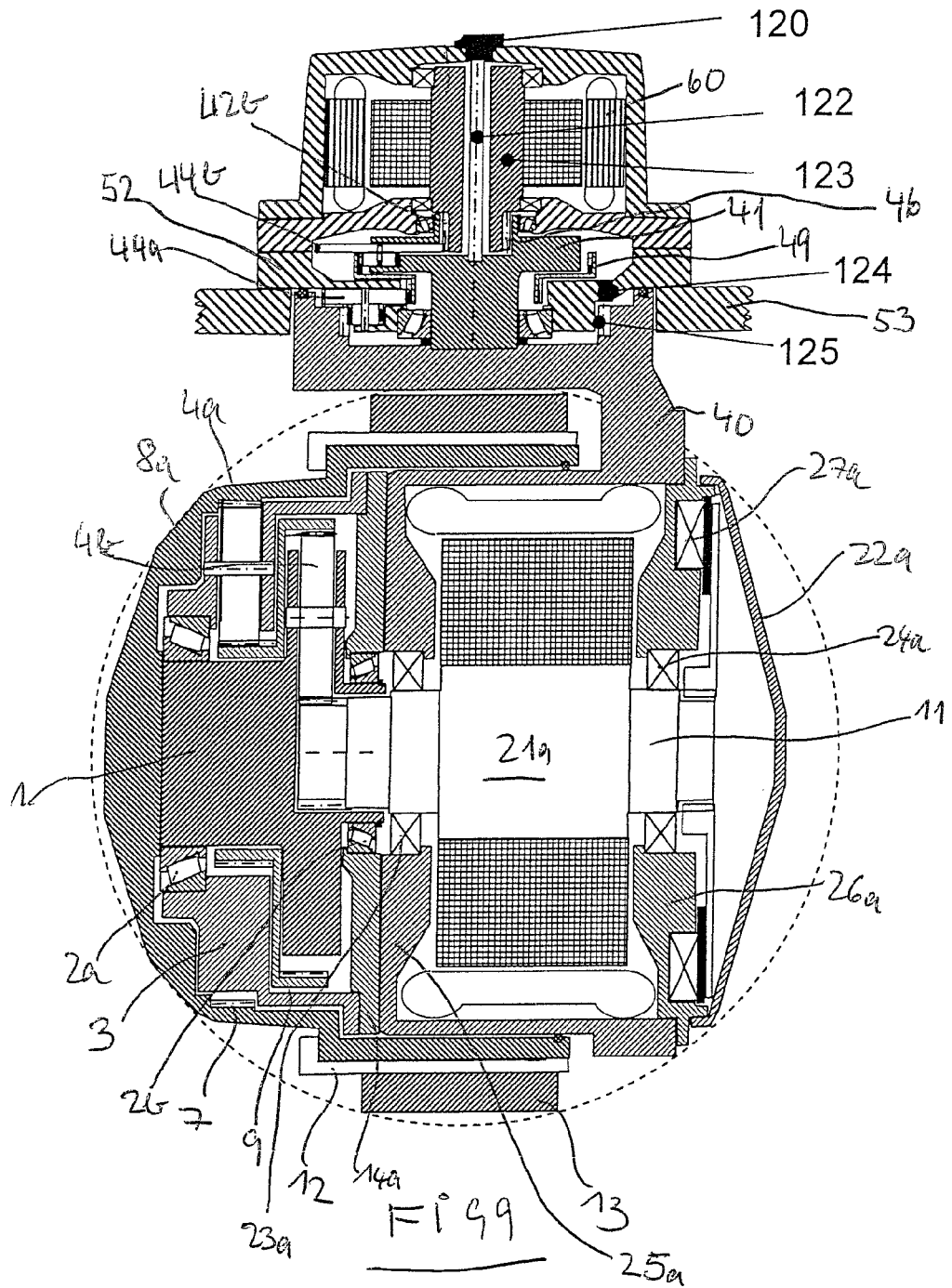

WHEEL HUB DRIVE FOR INDUSTRIAL TRUCKS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Wheel hub drives are frequently used for the travelling drive of industrial trucks. These are a combination of a wheel bearing and a gear system for the transformation of the driving torques and rotation numbers. Wheel hub drives are used in industrial trucks for unsteered as well as for steered wheels. The gear system transmits the driving torque from the drive motor to the driving wheel. The wheel bearing serves to support the vertical forces of the wheels. The space for construction is normally extremely limited, so that a compact construction is required.

In the state of the art, a series of wheel hub drives has become known. From EP 1 167 140 B1, the entire contents of which is incorporated herein by reference, or DE 102 58 913 A1, the entire contents of which is incorporated herein by reference, wheel hub drives have become known in which two taper roller bearings in O-arrangement form the wheel bearing and the drive gear system, realised as a planetary gear system, is disposed coaxially to the wheel's central axis. The outer diameter of the taper roller bearings is largely identical with the partial circle diameter of a hollow wheel of the planetary gear system. A wheel hub drive of similar construction, in which the drive gear system is radially accommodated in the wheel bearing and into which a brake as well as a drive motor is built in, is described in DE 100 61 221 A1.

DE 196 33 071 C2, the entire contents of which is incorporated herein by reference, discloses an one step planetary gear system for a wheel hub drive, in which the planet carrier serves for accommodating the wheel bearing, which consists of a roller bearing on the torque leading side and a roller bearing on the not torque leading side of the planet carrier laterally besides the planetary step. In order to reach the required gear ratio of the drive gear system, the planetary gear system is supplemented by a parallel shaft gear system, so that the drive motor is positioned hypoid to the wheel's central axis.

In DE 199 11 458 A1, the entire contents of which is incorporated herein by reference, a wheel hub drive of a wheel steered by an electric motor is disclosed, in which wheel bearing and drive gear system are disposed side by side. A fifth wheel for the wheel drive unit is rotatably mounted in the vehicle frame via a four point bearing, the steering gear system, realised as a wolfrom gear system, being accommodated radially inside the four point bearing. In the mentioned document, an arrangement is also disclosed by which a fifth wheel bearing, formed by two roller bearings, and the steering gear system realised as a planetary gear system are disposed one above the other, coaxially to the driving axis.

In DE 101 32 319 A1, the entire contents of which is incorporated herein by reference, DE 100 62 315 A1, the entire contents of which is incorporated herein by reference, and DE 103 34 939 A1, the entire contents of which is incorporated herein by reference, wheel hub drives for steered wheels are described, wherein drive motor or drive gear system are disposed radially inside at least one roller bearing of the wheel bearing, and the fifth wheel is rotatably mounted in the vehicle frame with the aid of a four point bearing.

The present invention is based on the objective to provide a wheel hub drive for industrial trucks, in which the unit consisting of drive gear system and wheel bearing is realised as to be particularly compact. An arrangement with outside diameter as small as possible and limited width is to be provided in particular, which transmits a maximum torque to the driving wheel.

BRIEF SUMMARY OF THE INVENTION

In the wheel hub drive according to the present invention, driving- and output axis of the drive gear system, rotation axis of the wheel and driving axis of the drive motor are coaxially disposed. The drive gear system is a single step or multi step planetary stepping gear system or a two or more step planetary coupler mechanism gear system Two horizontally spaced wheel bearings are located inside the drive gear system, wherein a first wheel bearing is disposed between a first bearing portion, connected with the wheel hub, and a frame-fixed planet carrier, and a second wheel bearing is disposed between the first bearing portion and a frame-fixed second bearing portion or the frame-fixed planet carriers.

In the present invention, a compact driving unit in a coaxial construction is obtained, which can serve for driving unsteered wheels (as a single drive or as part of an axis) as well as for driving steered wheels (manually or force-steered wheels). In the planetary coupler mechanism gear system, a partition of power to both gear system steps takes place, so that a higher torque capacity can be realised at identical construction space. The inside laying wheel bearing permits a maximum gear system diameter with respect to the wheel dimension, without that the axial construction length is increased in an appreciable degree. By using small wheel bearings, the expenditure for the latter is decreased.

The drive motor is an electric motor or an hydraulic motor.

According to one embodiment of the present invention, it is provided that a two step planetary coupler mechanism gear system is provided, and the first bearing portion is formed by a second planet carrier of a first step of the planetary coupler mechanism gear system. Alternatively, according to another embodiment of the present invention, it is provided that an one-step planetary step gear system be provided, wherein a bearing pin connected to the wheel hub forms both bearing portions for the wheel bearings, which prop up at the other side on the frame-fixed planet carrier. Preferably, the wheel bearings are taper roller bearings.

According to one embodiment of the present invention, it is advantageous for the two last-mentioned embodiments when the wheel hub as a hollow wheel forms an output element for the second step of the planetary coupler mechanism gear system or the last step of the planetary stepping gear system, respectively.

As already mentioned, the wheel hub drive according to the present invention can also be used for steered wheels in connection with a fifth wheel which is turnable around a vertical axis. In order to do this, one embodiment of the present invention provides that the frame is formed by a steered fifth wheel for the steered wheel of the wheel hub drive, which in a housing supports in bearings the drive motor and, as the case may be, a brake. According to a further embodiment of the present invention, the fifth wheel is rotatably mounted around a vertical axis via a four point bearing on a frame of the industrial truck. Alternatively, it is provided that the fifth wheel is supported in bearings via a vertical bearing pin and vertically spaced bearings on the vehicle frame.

When being applied to a steered wheel, it is advantageous according to a further embodiment of the present invention that drive gear system, drive motor and brake are disposed as an unit in a housing which is delimited by the wheel hub, the fifth wheel and a cover, wherein the cover is disposed on the side opposite to the wheel hub.

The fifth wheel may be actuated by a steering motor. In this context, one embodiment of the present invention provides that the steering motor is coupled with the fifth wheel via a steering gear system, a planetary coupler mechanism gear system or a single step or multi step planetary stepping gear system in particular, and the bearing of the fifth wheel is disposed inside the steering gear system. Even in this, a compact drive arrangement for the fifth wheel is obtained with maximum torque transmission.

An angle sensor can be connected with the housing of the steering drive, which lays on the axis of the steering motor. A shaft is connected with the fifth wheel or a bearing pin or planet carrier, respectively, connected with the fifth wheel, said shaft extending coaxially through the rotor of the steering motor towards the angle sensor. With the aid of such an angle sensor, an angle measurement can be performed, in which a further or alternative angle measurement is performed with an incremental sensor, which scans the outlines on an assembly part connected with the fifth wheel.

BRIEF DESCRIPTION OF THE SEVERAL VIEWS OF THE DRAWINGS

The present invention is explained in more detail in the following by means of several examples of its realisation.

FIG. 9 shows a cross-section through a wheel hub drive according to the present invention for a steered wheel with a steering gear system for the travelling drive and the steering drive.

DETAILED DESCRIPTION OF THE INVENTION

Figure 1:
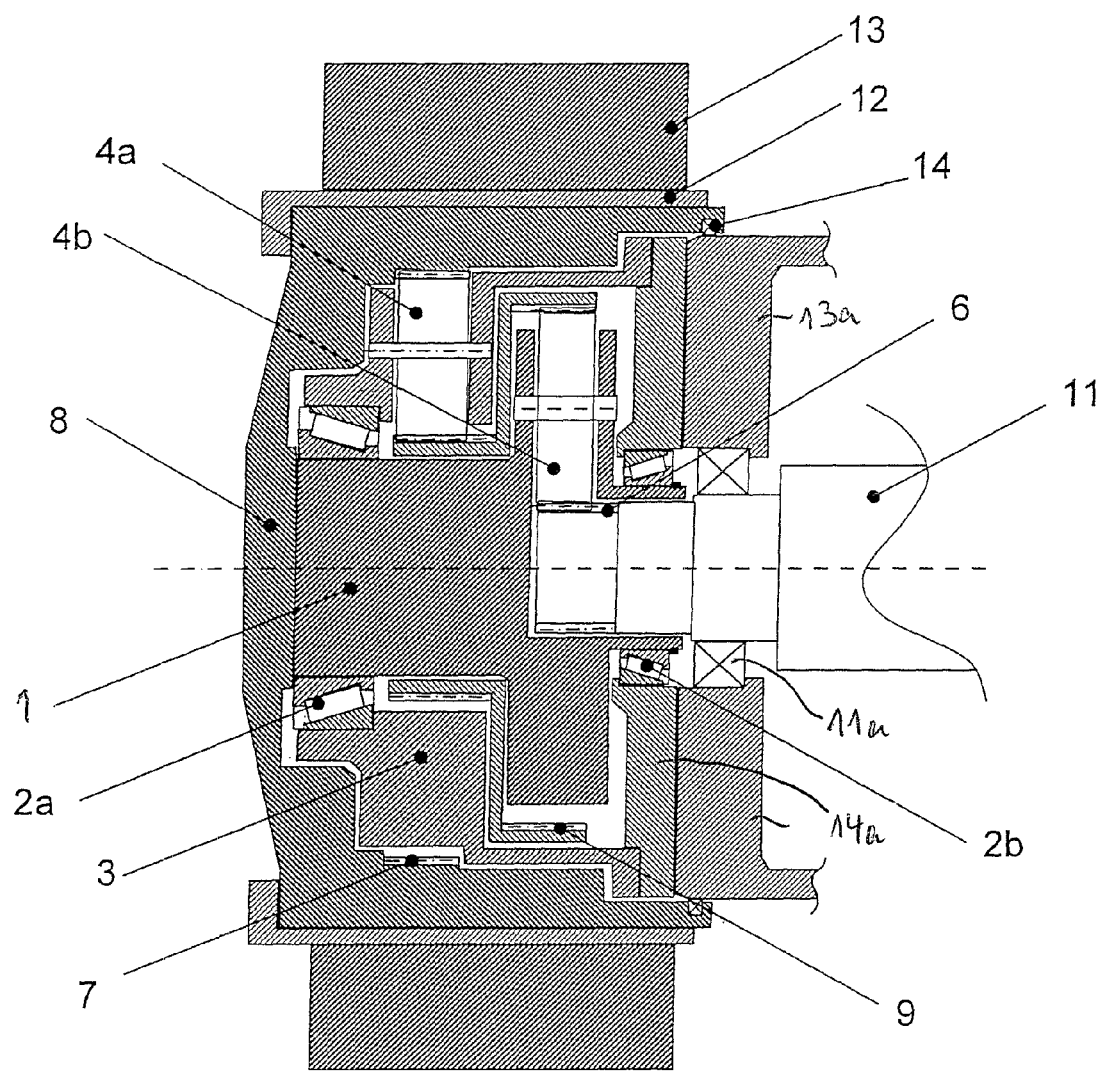
FIG. 1 shows a cross-section through a wheel hub drive according to the present invention with a planetary coupler mechanism gear system.

While this invention may be embodied in many different forms, there are described in detail herein a specific preferred embodiment of the invention. This description is an exemplification of the principles of the invention and is not intended to limit the invention to the particular embodiment illustrated In FIG. 1, a tire 13 sits on a wheel rim 12. The shown wheel is a driven wheel of an industrial truck for instance, a four wheel fork lifter for example. It is driven by a not shown drive motor, which can be an electric or an hydraulic motor, via a drive shaft 11. The drive shaft 11 is rotatably mounted in a frame portion 13a of the industrial truck via a bearing 11a. A shield 14a is fixedly connected with the frame portion 13a.

At the end of the driving shaft 11, a spicket 6 is formed on, which can be also separately disposed splinedly on the shaft 11, however. It meshes with planet wheels 4b, which are held and mounted in beatings in a planet carrier 1. The planet carrier 1 is fixedly bound to a hub 8 of the wheel, which is approximately cup-shaped, the edge portion forming a hollow wheel with an interior tooth system 7 in this. The planet wheels 4b mesh with a portion of a coupling shaft 9, the other portion of which co-operates with planet wheels 4a, which are mounted in bearings in a planet carrier 3, which on its turn is fixedly bound to the shield 14a. The planet wheels 4a co-operate with the tooth system 7 of the hollow wheel, and the latter forms the output part for rotating the shown wheel.

A first taper roller bearing 2a is disposed between the planet carriers 1, 3 next to the hub 8, and a second taper roller bearing 2b is disposed between a portion of the planet carrier 1, which is relatively small in its diameter, and the shield 14a. The roller bearings 2a, 2b serve for the transmission of the vertical forces of the wheels to the frame 13a.

As can be recognised, there is a planetary coupler mechanism gear system as the drive gear system, the bearings 2a, 2b being located inside the drive gear system. In order to achieve a high gear ratio, the planetary wheels 4a, 4b can be also realised as stepwise planet wheels. An additional planetary gear system can be also installed before the gear system, and on the driving shaft 11, a brake, a wet-running multiplate brake or an electromagnet brake for instance, may be installed.

As can be recognised, the axes of the drive motor and of the driving shaft, respectively, the wheel axis and the axis of the drive gear system are coaxial. For the accommodation of the bearing 2a, the planet carrier 1 is formed as a cylindrical portion in the region of the bearing, which is capable to receive high forces. The bearings 2a, 2b are in every case radially significantly inside the axes of the planet wheels 4a, 4b. As a whole, a very compact drive gear system is formed, with maximum gear system diameter with respect to the dimensions of the wheel, The diameter of the bearings is relatively small, so that the expenditure for them is relatively small.

Figure 2:
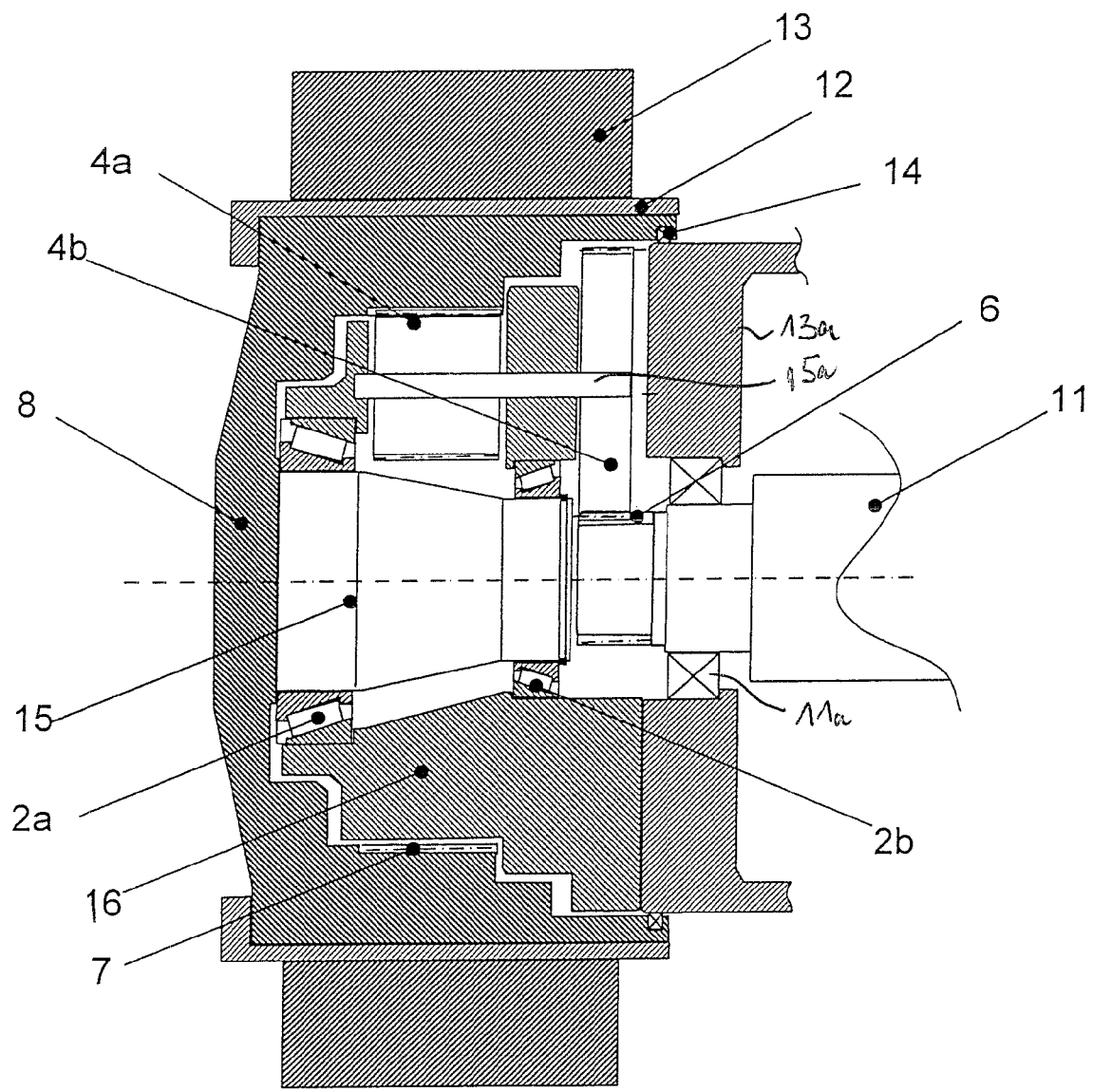
FIG. 2 shows a cross-section through a wheel hub drive according to the present invention with a planetary stepping gear system.

In so far as same parts as in FIG. 1 are shown in the embodiment according to FIG. 2, they are provided with equal reference signs. In difference to the embodiment according to FIG. 1, in that one according to FIG. 2 a planetary stepping gear system is provided, with planet wheels 4a and planet wheels 4b, the latter ones being in engagement with the pinion 6. The planet wheels 4a, 4b are coupled via a shaft 15. A planet carrier 16 is fixedly connected with the frame portion 13*a*. A bearing pin 15 is fixedly connected with the hub 8, which is composed of a first cylindrical portion, a conical one and a second cylindrical portion smaller in diameter, On the first cylindrical portion sits the taper roller bearing 2*a*, which props up at the outside on the planet carrier 16. On the second cylindrical portion of the bearing pin 15 sits the second taper roller bearing near the sprocket 6. At the outside, it also props up on a portion of the planet carrier 16. The output portion is again formed by the hollow wheel of the hub 8 with the tooth system 7, with which the planet wheels 4*a* are in engagement.

A contacting sealing 14 is disposed between the edge of the hub 8 and the frame portion 13*a*. Besides, the same is also the case in the embodiment according to FIG. 1.

Figure 3:
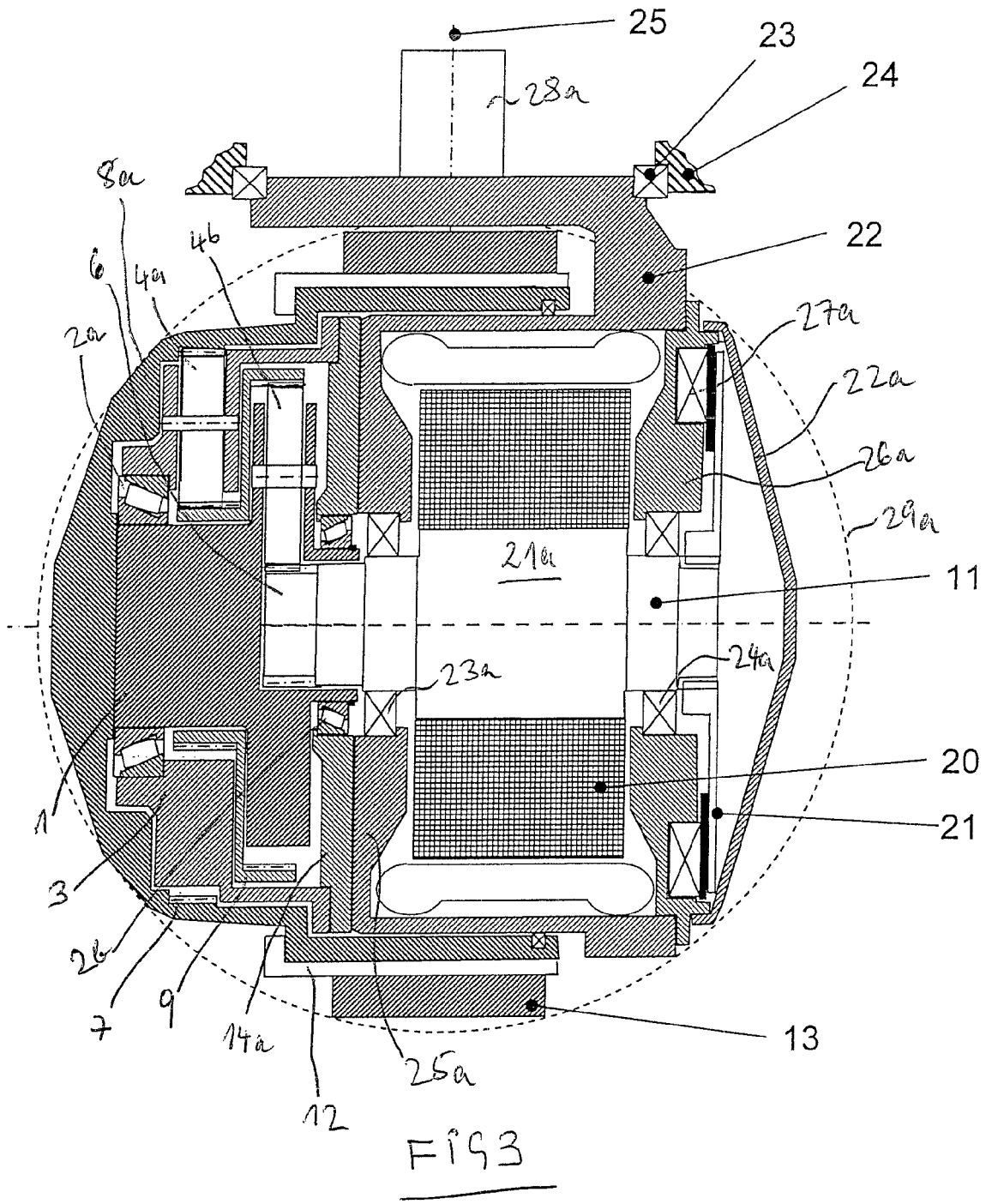
FIG. 3 shows a wheel hub drive for a steered wheel with a planetary coupler mechanism gear system as the travelling drive gear system.

In the embodiment according to FIG. 3, a drive gear system as shown in FIG. 1 is provided for a steerable wheel and disposed inside a housing, which is delimited by a hub 8*a*, a fifth wheel 22 and a housing cover 22*a*. The shown planetary coupler mechanism gear system is similar to that according to FIG. 1, so that equal parts are provided with same reference signs. An electric motor 21*a* is also disposed in the designated housing, and its driving shaft is mounted via bearings 23*a* and 24*a* in a wall portion 25*a* of the fifth wheel 22 and in a shield portion 26*a* at the opposite side of the motor 21 *a*, respectively. The latter holds an electric braking magnet 27*a*, which co-operates with a brake disc 21 which sits axially partially movable, but splinedly on the motor shaft 11. Brake, motor 21*a* and drive gear system are coaxial with respect to their axes and form an unity with the wheel and the fifth wheel. The fifth wheel 22 has a pin 28*a*, which has a vertical axis 25, around which the fifth wheel can be swiveled. The space required for the drive unit in this is indicated in FIG. 3 by the circle 29*a* drawn in broken lines. The fifth wheel 22 is pivotally mounted around the vertical axis 25 in the frame portion 24 with the aid of a so-called four point bearing 23. The swiveling of the fifth wheel 22 takes place via a drawbar, for instance.

Figure 4:
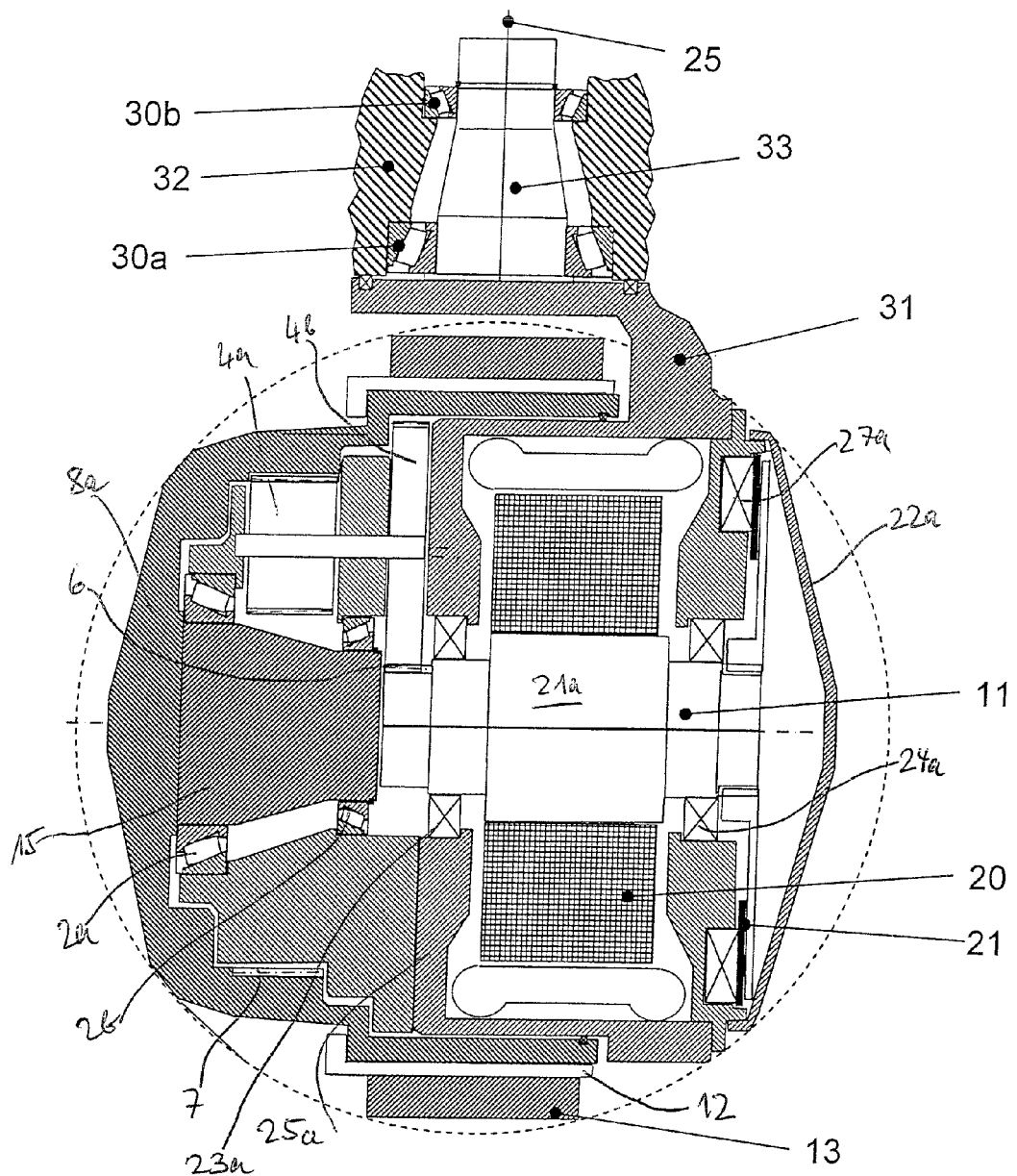
FIG. 4 shows a cross-section through a wheel hub drive for a steered wheel with a planetary stepping gear system as the travelling drive gear system.

In the embodiment according to FIG. 4, a wheel hub drive unit is shown for a steered wheel with a planetary stepping gear system according to FIG. 2 and a drive motor with brake according to FIG. 3. Therefore, the parts which coincide with those according to FIGS. 2 and 3 are provided with the same reference signs. As can be further recognised from FIG. 4, a vertical bearing pin 33 is connected with the upper portion of the fifth wheel 31 which is pivotally mounted around a vertical axis 25 via a lower taper roller bearing 30*a* and an upper taper roller bearing 30*b* in the frame portion 32, The steering movement on the spigot 33 can take place via a drawbar for instance, or even by a not shown steering drive motor, an electric or hydraulic motor for instance.

Figure 5:
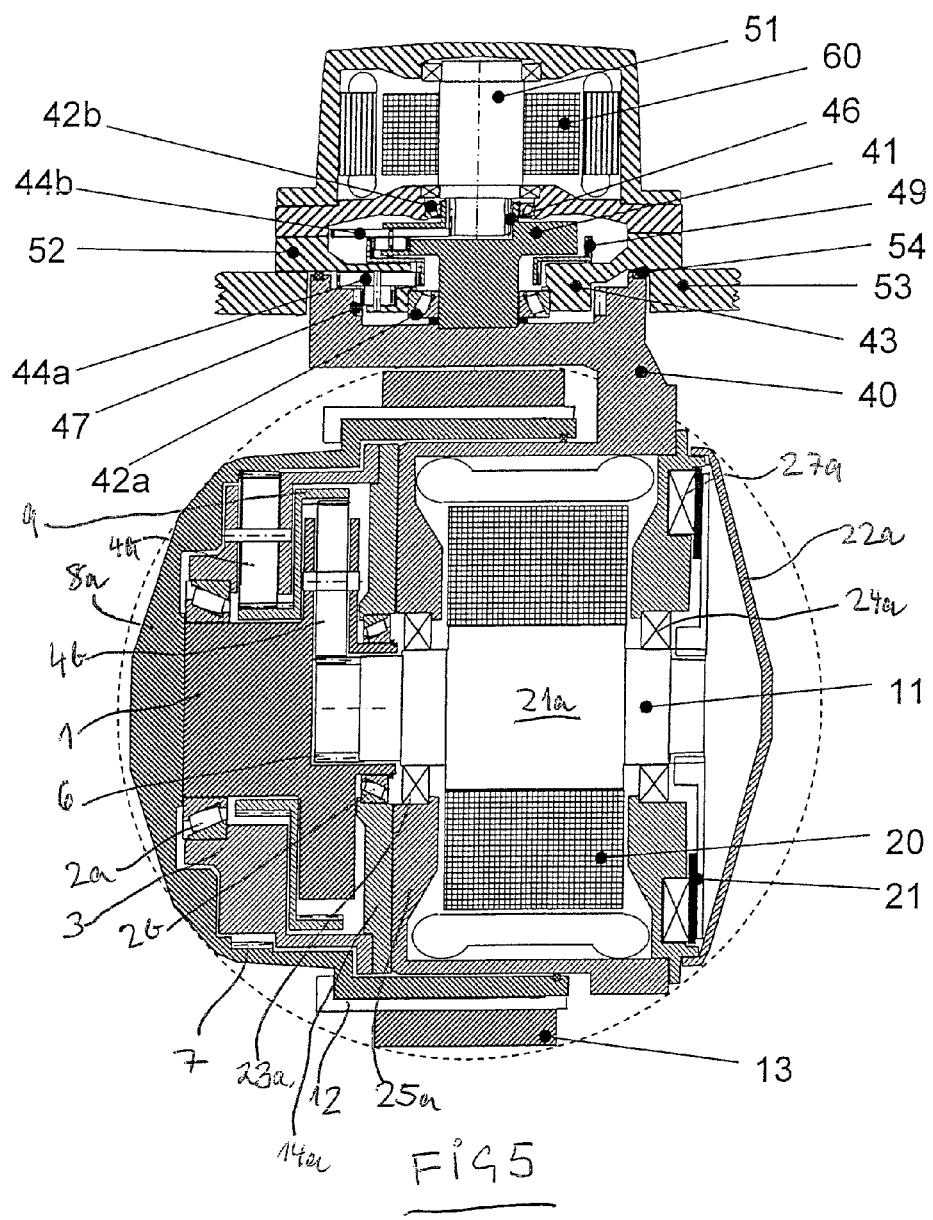
FIG. 5 shows a cross-section through a wheel hub drive according to the present invention for a steered wheel with a planetary coupler mechanism gear system as a travelling drive gear system and a planetary coupler mechanism gear system as a steering gear system.

The wheel hub drive shown in FIG. 5 serves for a steered wheel, the drive gear system being similar to that one according to FIG. 1 and the drive motor and the brake being similar to the arrangement according to FIG. 3 or 4. Therefore, parts which coincide with those according to FIG. 1, 3 or 4 are provided with the same reference signs. The steering movement of the shown drive unit according to FIG. 5 is generated by a steering motor 60, which acts on a fifth wheel 40 via a two-step planetary coupler mechanism gear system. A planet carrier 41 connected with the fifth wheel 40 serves for the accommodation of the fifth wheel bearing, which is formed by two roller bearings 42*a*, 42*b*, which are taper roller bearings in the shown case. The first roller bearing 42*a* is accommodated on the opposite side in a stationary planet carrier 43, and the second bearing 42*b* is disposed in a part of the steering gear system housing 52 which is fixed on a vehicle frame 53. Planet wheels 44*a*, 44*b* of the two steps of the planetary coupler mechanism gear system are in effective connection with each other via a coupling shaft 49. The steering gear system is driven by a steering motor shaft 51, on which a drive sprocket 46 sits or which is formed in one part with it, respectively. The output of the steering gear system is effected through the planet carrier 41 fixed on the fifth wheel 40 on the one hand, and on the other hand by a hollow wheel 47 connected with the fifth wheel. A contacting sealing 54 seals up the fifth wheel 40 with respect to the housing of the drive unit. In the present case, the steering motor 60 is an electric motor. However, it may be also an hydraulic motor.

Figure 6:
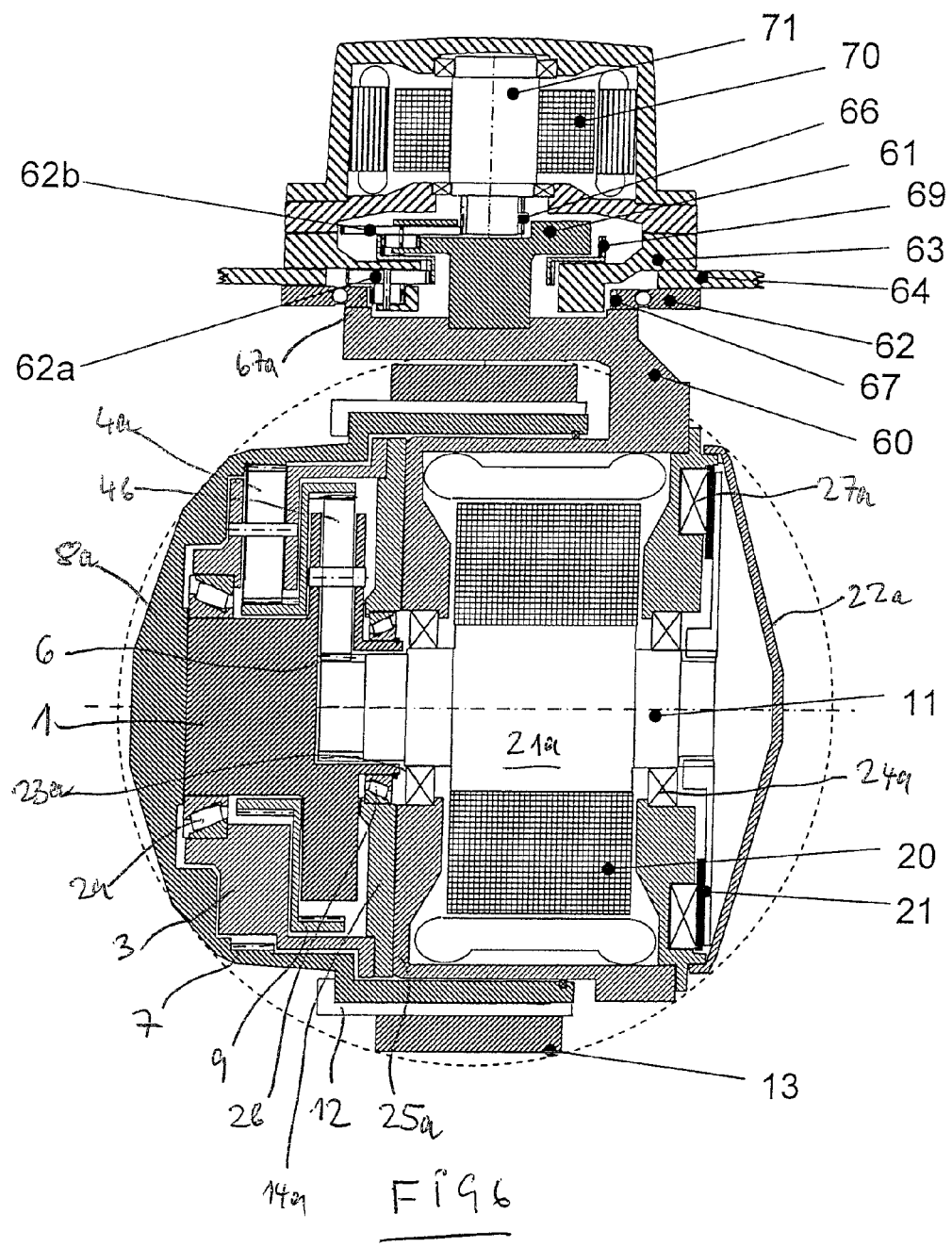
FIG. 6 shows a cross-section through a wheel hub drive according to the present invention for a steered wheel with a planetary coupler mechanism gear system as a travelling drive gear system and a planetary coupler mechanism gear system as a steering gear system.

The embodiment according to FIG. 6 differs from that one according to FIG. 5 essentially through the bearing of the steering drive. For the rest, parts equal to the embodiment of FIG. 5 are provided with equal reference signs. The steering movement takes place via a steering motor 70 and a two-step planetary coupler mechanism gear system, which is disposed coaxially to the steering motor shaft 71. In order to achieve a high transmission ratio, planet wheels 4*a*, 62*b*, 62*a* are realised as stepped planet wheels. They are mounted in the planet carrier 61, which is splinedly connected with the fifth wheel 60, and in the planet carrier 63, which is fixedly connected with the frame portion 64. The planet wheels 62*a*, 62*b* of the two steps of the planetary coupler mechanism gear system are in effective connection via a coupling shaft 69. A drive sprocket 66 of the steering motor shaft 71 co-operates with the larger step of the planet wheels 62*b*. The output of the steering gear system is effected through the planet carrier 61 fixed on the fifth wheel 60 on the one hand, and on the other hand by the inner part 67*a* of a four point bearing 62, which is provided with an inner tooth system 67. The outside part of the four point bearing is fixedly connected with the frame portion 64. The steering motor 70 is an electric motor.

Figure 7:
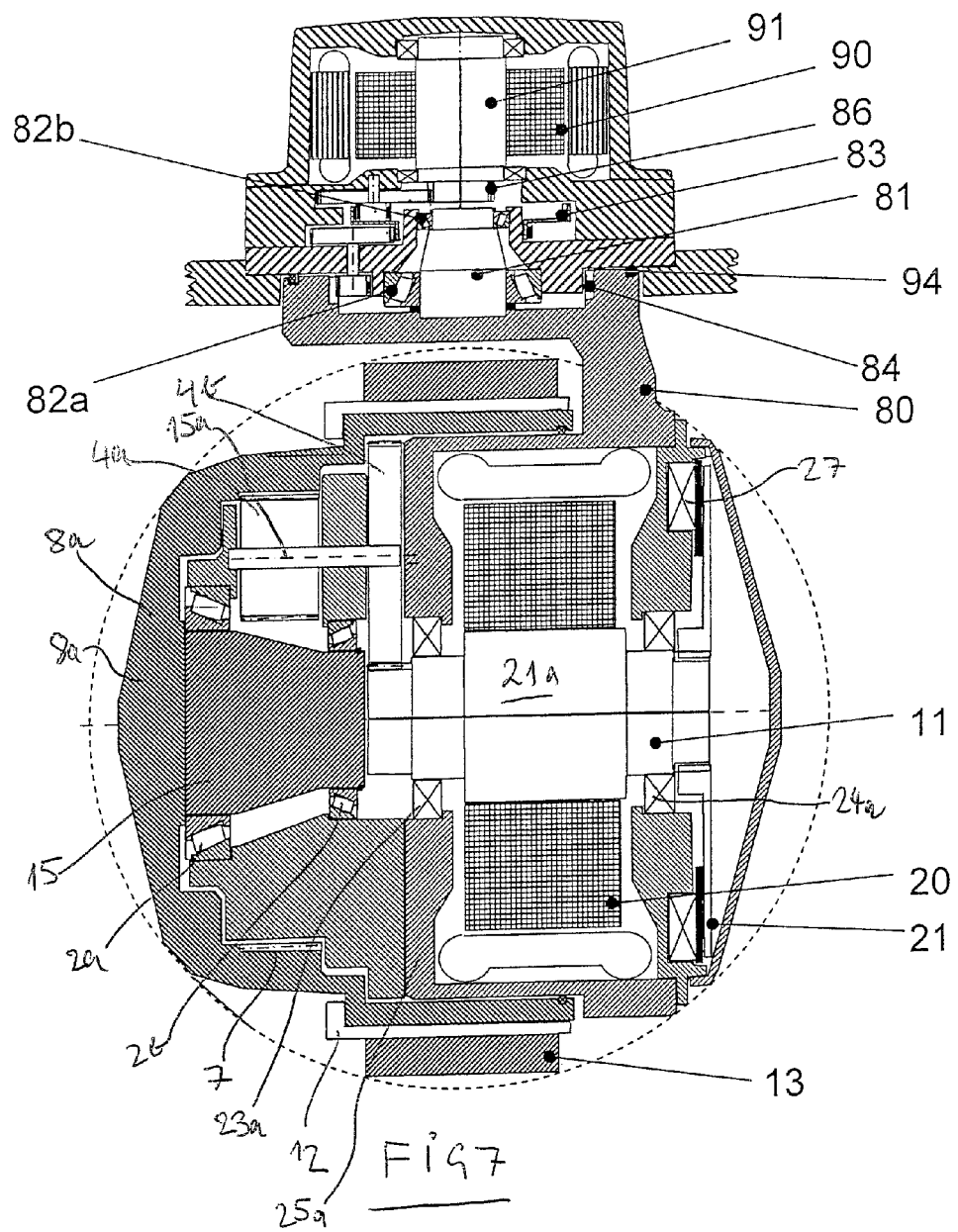
FIG. 7 shows a cross-section through a wheel hub drive according to the present invention for a steered wheel with a planetary stepping gear system as a travelling drive gear system and a planetary stepping gear system as a steering gear system.

The embodiment according to FIG. 7 differs from that one according to FIG. 4 through the realisation of a steering driven by a motor. For the rest, parts equal to FIG. 4 are provided with equal reference signs. Besides, the drive gear system is similar to the embodiment according to FIG. 2. A steering movement is generated by a steering motor 90, wherein its steering motor shaft 91 acts on a fifth wheel 80 via a two-step planetary stepping gear system. A bearing pin 81, connected with the fifth wheel, serves for the accommodation of the fifth wheel's bearing, which is formed by two vertically spaced taper roller bearings 82*a*, 82*b*. On the opposite side, the roller bearings 82*a*, 82*b* are accommodated by parts of the steering gear system housing. The planet wheels of the two steps of the planetary stepping gear system are in effective connection via a connection shaft 83. A drive sprocket 86 on the motor shaft 91 co-operates with the greater step of the stepped planet wheels of the first gear system step. The output of the steering gear system is effected by a hollow wheel 84, which is connected with the fifth wheel 80. A contacting sealing 94 seals up the fifth wheel 80 with respect to the housing of the steering drive unit.

Figure 8:
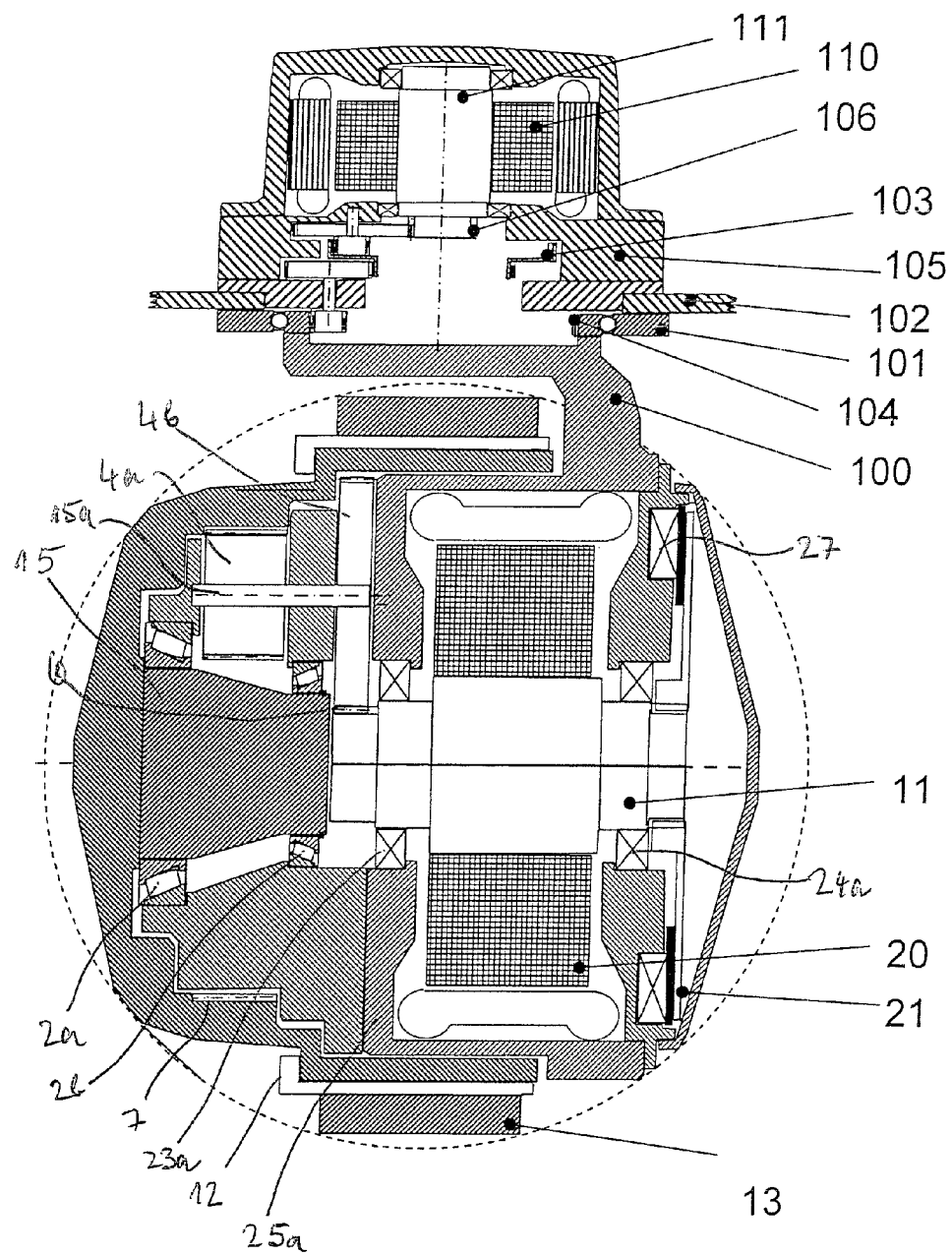
FIG. 8 shows a cross-section through a wheel hub drive according to the present invention for a steered wheel with a planetary stepping gear system as a travelling drive gear system and a planetary stepping gear system as a steering gear system.

The embodiment according to FIG. 8 differs from that one according to FIG. 7 through the steering drive. Therefore, parts equal to FIG. 7 are provided with equal reference signs. The steering movement is generated by a steering motor 110 and is transmitted to a fifth wheel 100 via a two-step planetary stepping gear system. A four point bearing is provided for the fifth wheel's bearing, the movable inner part of which is connected with the fifth wheel, and its outer part with a housing 105 or the vehicle frame 102, respectively. The planet wheels of the two steps of the planetary stepping gear system are in effective connection via a connection shaft 103. The steering gear system is driven by a drive sprocket 106, which is fixed on the steering motor shaft 11 or formed from that shaft. The output of the steering gear system is effected by the inner part of the four point bearing 101, which is provided with an inner tooth system 104. The steering motor is an electric motor.

The embodiment according to FIG. 9 is essentially similar to that one according to FIG. 5, with respect to the realisation of the wheel hub drive unit as well as with respect to the steering drive unit. Therefore, parts equal to FIG. 5 are provided with equal reference signs. In FIG. 9, a hollow shaft 123 is provided instead of the steering motor shaft 51 according to FIG. 5. Through this extends a steering angle sensor shaft 122, which is fixedly connected with the planet carrier 41. It extends towards the housing of the steering drive, on which a steering angle sensor 120 is attached. The steering angle sensor 120 measures the steering angle of the fifth wheel 40, redundant to the steering angle acquirement in the steering motor. A redundant steering angle sensing is also possible with an incremental sensor 124, which scans outlines on an assembly part connected with the fifth wheel 40, namely here the hollow wheel tooth system 125.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below This completes the description of the preferred and alternate embodiments of the invention. Those skilled in the art may recognize other equivalents to the specific embodiment described herein which equivalents are intended to be encompassed by the claims attached hereto.

What is claimed is:

1. A wheel hub drive with drive motor and drive gear system for industrial trucks, comprising:
   driving and output axis of the drive gear system, rotation axis of a wheel and driving axis of the drive motor are disposed coaxially;
   the drive gear system is a single step or multi step planetary stepping gear system or a two or more step planetary coupler mechanism gear system;
   two horizontally spaced wheel bearings are located inside the drive gear system, wherein a first wheel bearing (2*a*) is disposed between a first bearing portion, connected with the wheel hub (8), and a frame-fixed planet carrier (3, 16), and a second wheel bearing (2*b*) is disposed between the first bearing portion and a frame-fixed second bearing portion or the frame-fixed planet carrier (3, 16), and
   further characterised in that a two step planetary coupler mechanism gear system is provided, and the first bearing portion is formed by a second planet carrier (1) of a first step of the planetary coupler mechanism gear system.

2. A wheel hub drive according to claim 1, characterised in that the hub (8, 8*a*) as a hollow wheel forms an output element for the second step of the planetary coupler mechanism gear system or the last step of the planetary stepping gear system, respectively.

3. A wheel hub drive according to claim 1, characterised in that the wheel bearings are formed by taper roller bearings.

4. A wheel hub drive according to claim 1, characterised in that a frame is formed by a steering fifth wheel for a steered wheel of the wheel hub drive, in a housing, supports both the drive motor and a brake on bearings.

5. A wheel hub drive according to claim 1, characterised in that the drive motor is an electromotor or a hydraulic motor.

6. A wheel hub drive with drive motor and drive gear system for industrial trucks, comprising:
   driving and output axis of the drive gear system, rotation axis of a wheel and driving axis of the drive motor are disposed coaxially;
   the drive gear system is a two step planetary coupler mechanism gear system;
   two horizontally spaced wheel bearings are located inside the drive gear system, wherein a first wheel bearing is disposed between a first bearing portion, connected with the wheel hub, and a frame-fixed planet carrier, and a second wheel bearing is disposed between the first bearing portion and a frame-fixed second bearing portion or the frame-fixed planet carrier,
   further wherein the first bearing portion is formed by a second planet carrier of a first step of the planetary coupler mechanism gear system.

7. A wheel hub drive with drive motor and drive gear system for industrial trucks, comprising:
   driving and output axis of the drive gear system, rotation axis of a wheel and driving axis of the drive motor are disposed coaxially;
   the drive gear system is a single step or multi step planetary stepping gear system or a two or more step planetary coupler mechanism gear system;
   two horizontally spaced wheel bearings are located inside the drive gear system, wherein a first wheel bearing is disposed between a first bearing portion, connected with the wheel hub, and a frame-fixed planet carrier, and a second wheel bearing is disposed between the first bearing portion and a frame-fixed second bearing portion or the frame-fixed planet carrier,
   further wherein the hub as a hollow wheel forms an output element for the second step of the planetary coupler mechanism gear system or the last step of the planetary stepping gear system, respectively.

* * * * *